US008276203B2

(12) United States Patent
Nakhre et al.

(10) Patent No.: US 8,276,203 B2
(45) Date of Patent: Sep. 25, 2012

(54) SYSTEM AND METHOD FOR MITIGATING A DENIAL OF SERVICE ATTACK IN A SUBSCRIBER NETWORK

(75) Inventors: Tushar A. Nakhre, Herndon, VA (US); Shan Huang, Ashburn, VA (US); Michael S. Kelsen, Centreville, VA (US)

(73) Assignee: Time Warner Cable Inc., New York, NY (US)

( * ) Notice: Subject to any disclaimer, the term of this patent is extended or adjusted under 35 U.S.C. 154(b) by 384 days.

(21) Appl. No.: 12/614,820

(22) Filed: Nov. 9, 2009

(65) Prior Publication Data
US 2011/0113489 A1 May 12, 2011

(51) Int. Cl.
*G06F 21/00* (2006.01)
(52) U.S. Cl. ............... 726/22; 726/1; 709/224
(58) Field of Classification Search ............... 726/1, 22; 709/224; 725/105
See application file for complete search history.

(56) References Cited

U.S. PATENT DOCUMENTS

| 6,636,485 | B1* | 10/2003 | Fijolek et al. | 370/252 |
|---|---|---|---|---|
| 2005/0259645 | A1* | 11/2005 | Chen et al. | 370/389 |
| 2006/0098643 | A1* | 5/2006 | Pfeffer et al. | 370/389 |
| 2006/0115058 | A1* | 6/2006 | Alexander et al. | 379/90.01 |
| 2007/0061831 | A1* | 3/2007 | Savoor et al. | 725/13 |
| 2009/0310596 | A1* | 12/2009 | Joyce et al. | 370/352 |
| 2010/0325217 | A1* | 12/2010 | Mody et al. | 709/206 |
| 2011/0007752 | A1* | 1/2011 | da Silva et al. | 370/468 |

* cited by examiner

*Primary Examiner* — Hadi Armouche
(74) *Attorney, Agent, or Firm* — The Marbury Law Group, PLLC

(57) ABSTRACT

A system and method for mitigating a denial of service attack in a subscriber network. A traffic monitor monitors bandwidth usage of a subscriber network that is directed to a particular port. The traffic monitor detects excessive traffic based on preset thresholds or algorithms. When excessive traffic is detected, the traffic monitor may obtain the source IP address from headers in the packet stream and identify the device or devices from which the packets were delivered to the network. Using the IP addresses of affected devices, a policy may be implemented to throttle packets originating from those devices that are directed to the particular port.

14 Claims, 3 Drawing Sheets

SYSTEM AND METHOD FOR MITIGATING A DENIAL OF SERVICE ATTACK IN A SUBSCRIBER NETWORK

BACKGROUND

Hybrid Fiber Coax (HFC) cable networks were originally built to deliver broadcast-quality TV signals to homes. The wide availability of such systems and the extremely high bandwidth of these systems led to the extension of their functionality to include delivery of high-speed broadband data signals to end-users. Data over Cable System Interface Specifications (DOCSIS), a protocol elaborated under the leadership of Cable Television Laboratories, Inc., has been established as the major industry standard for two-way communications over HFC cable plants.

The basic elements of a DOCSIS 1.x compliant cable network are the cable modem (CM), located on at the subscriber's site, and the cable modem termination system (CMTS) and headend located in facilities operated by the cable service provider. The CM may be a discrete device or integrated into a device that provides additional functionality. The medium between the CMTS and the different CMs is a two-way shared medium, in which the downstream channels carry signals from the head-end to users and upstream channels carry signals from users to head-end. A CM is normally tuned to one upstream channel and the associated downstream channel. The upstream channel is an inherently shared medium in which slots are reserved using a contention system while the downstream is a broadcast dedicated link from the CMTS to the CM.

A quality of service (QoS) level is defined for communications between a CM and a CMTS for each service to which a subscriber subscribes. For example, a basic data service subscriber may receive downstream traffic at a maximum burst rate of 3 Mbps, while a premium subscriber may receive downstream traffic at maximum burst rate of 6 Mbps. Voice over IP (VoIP) services are typically provided with very stringent QoS requirements to assure that the quality of a cable-delivered telephone call will equal or exceed the call quality of a call placed over the public switched telephone network.

The principal mechanism in DOCSIS 1.x for providing enhanced QoS is to classify packets traversing a path between a CM and a CMTS into a service flow. A service flow is a unidirectional flow of packets that is provided a particular Quality of Service. The CM and CMTS provide this QoS by shaping, policing, and prioritizing traffic according to a QoS parameter set defined for the service flow.

Service flows exist in both the upstream and downstream direction, and may exist without actually being activated to carry traffic. Service flows typically have a 32-bit service flow identifier (SFID) assigned by the CMTS. An active and admitted upstream service flow also has a 14-bit Service Identifier (SID). At least two service flows are defined in a configuration file received by a CM—one for upstream and one for downstream service. The first upstream service flow describes the primary upstream service flow, and is the default service flow used for otherwise unclassified traffic. The first downstream service flow describes service to the primary downstream service flow. Additional service flows defined in the configuration file create service flows that provide QoS services.

Conceptually, incoming packets are matched to a classifier that determines to which QoS service flow the packet is forwarded. The header of the packet is examined. If the packet matches one of the classifiers, it is forwarded to the service flow indicated by the SFID attribute of the classifier. If the packet is not matched to a classifier, it is forwarded on the primary service flow.

Systems and methods for configuring service flows are described in commonly owned U.S. Pat. No. 7,388,870 entitled "A System and Method for Providing Premium Transport in a DOCSIS-Compliant Cable Network," and pending continuation application Ser. No. 12/401,863. The U.S. Pat. No. 7,372,809 and the application Ser. No. 12/401,863 are incorporated herein in their entireties by reference for all purposes.

The process for managing service flows in the DOCSIS 1.x environment requires that policies be configured on the CM. In order to relieve the CM and other subscriber components from involvement in QoS determination and to support dynamic flows that may come and go, a newer architecture, PacketCable Multimedia (PCMM), was defined. PCMM is intended to provide a framework where reliable DOCSIS resources can be reserved for a variety of applications, which include videoconferencing, interactive gaming, streaming media, and so on. The PCMM framework allows for client devices to use PCMM resources without having to be tightly integrated in the resource reservation and commitment processes.

FIG. 1 is a block diagram illustrating the logical components of a PCMM framework implement in a DOCSIS-compliant network.

A multimedia client 100 is an application or device using a multimedia service. Multimedia clients include applications that stream audio and/or video, gaming consoles, voice over IP (VoIP) telephones. Typically, clients connect to the cable network via a cable modem 102.

A client may be categorized by how involved the client is in establishing the QoS for the application. Clients that have no involvement depend on an applications manager 106 to set up QoS resources. Other categories of clients may share the QoS setup functions with the applications manager 106 or perform all of the QoS setup functions locally. An applications server 104 may be configured to handle multimedia session requests on behalf of the client 102.

The applications manager 106 receives the request to establish a multimedia session either directly from the client 102 or from the applications server 104. The applications manager 106 is responsible for applying service policies. Applying service policies includes determining the QoS to which the client 102 is entitled. Information about the QoS is then conveyed to a policy server 108. This information may be in the form of specific QoS parameters or it may be in the form of a service name that the policy server 108 may associate with a set of parameters. The policy server 108 confirms the QoS selected by the applications manager 106. The applications manager 106 reserves the resources on behalf of the client.

The reserved QoS parameters are pushed to the CMTS 110 by the policy server 108.

Network resources are not only affected by the demands of the various applications run over the network. Overconsumption of network resources whether by high-demand subscribers or by attackers may also affect the QoS available to all subscribers.

Consider the impact on a network when a large number of subscribers are infected with software application (a "bot") that either allows the attacker to control the infected computers or that performs automated routines on the infected computers that runs automated tasks and that facilitates a distributed denial of service (DDoS) attack on a DNS server. In a DDoS attack, the attacker infects a large number of computers connected to the Internet. A DDoS on DNS floods the DNS server with DNS request messages. Such an attack may exhaust bandwidth, router processing capacity, and network stack resources thereby breaking network connectivity to the targets. There are various techniques for detecting a DDoS attack. One approach is to detect changes in the packet traffic at one or more routers or nodes in the network being monitored. The changes are detected by comparing traffic in real-time or over a pre-set period to a baseline measure of traffic at the nodes. The baseline data may be time sensitive and destination (or port) sensitive. In addition, the changes may be measured in terms of volume (number of packets) and packet distribution (packet volume of the nodes relative to each other). Other techniques may also be used. Systems and methods for thwarting a DDoS are described in commonly owned U.S. Pat. No. 7,372,809 entitled, "Thwarting Denial of Service Attacks Originating in a DOCSIS-Compliant Cable Network," which patent is incorporated herein in its entirety by reference for all purposes.

In a DOCSIS 1.X environment, a service provider may attempt to expand DNS capacity to dilute the effects of the DDoS attack or isolate the infected subscriber devices ("zombies") by reconfiguring their modems. The latter solution necessitates a reboot of the infected modems and will result in increased subscriber complaints. The former will be transparent to the subscribers but is an inefficient use of network resources.

The PCMM architecture allows the network operator to dynamically restrict network access to subscribers who are exceeding a threshold usage limit. Throttling a subscriber dynamically may resolve the excess consumption situation but effectively denies the subscriber access to the data network.

SUMMARY

Embodiments herein provide systems and methods for using the PCMM architecture to impose limits on network usage on a per subscriber and per application or port basis.

In an embodiment, a traffic monitor monitors bandwidth usage of a subscriber network that is directed to particular ports. The traffic monitor may detect excessive traffic based on preset thresholds or algorithms. When excessive traffic is detected, the traffic monitor may obtain the source IP address from headers in the packet stream and identify the device or devices from which the packets were delivered to the network. Using the IP addresses of affected devices, a policy may be implemented to throttle packets originating from those devices that are directed to the particular port. In this way, the network may be protected from the affected subscribers without restricting the subscribers' usage of all services provided over the network.

DETAILED DESCRIPTION

In an embodiment, a traffic monitor monitors bandwidth usage of a subscriber network that is directed to particular ports. The traffic monitor may detect excessive traffic based on preset thresholds or algorithms. When excessive traffic is detected, the traffic monitor may obtain the source IP address from headers in the packet stream and identify the device or devices from which the packets were delivered to the network. Using the IP addresses of affected devices, a policy may be implemented to throttle packets originating from those devices that are directed to the particular port. In this way, the network may be protected from the affected subscribers without restricting the subscribers' usage of all services provided over the network.

Figure 1:
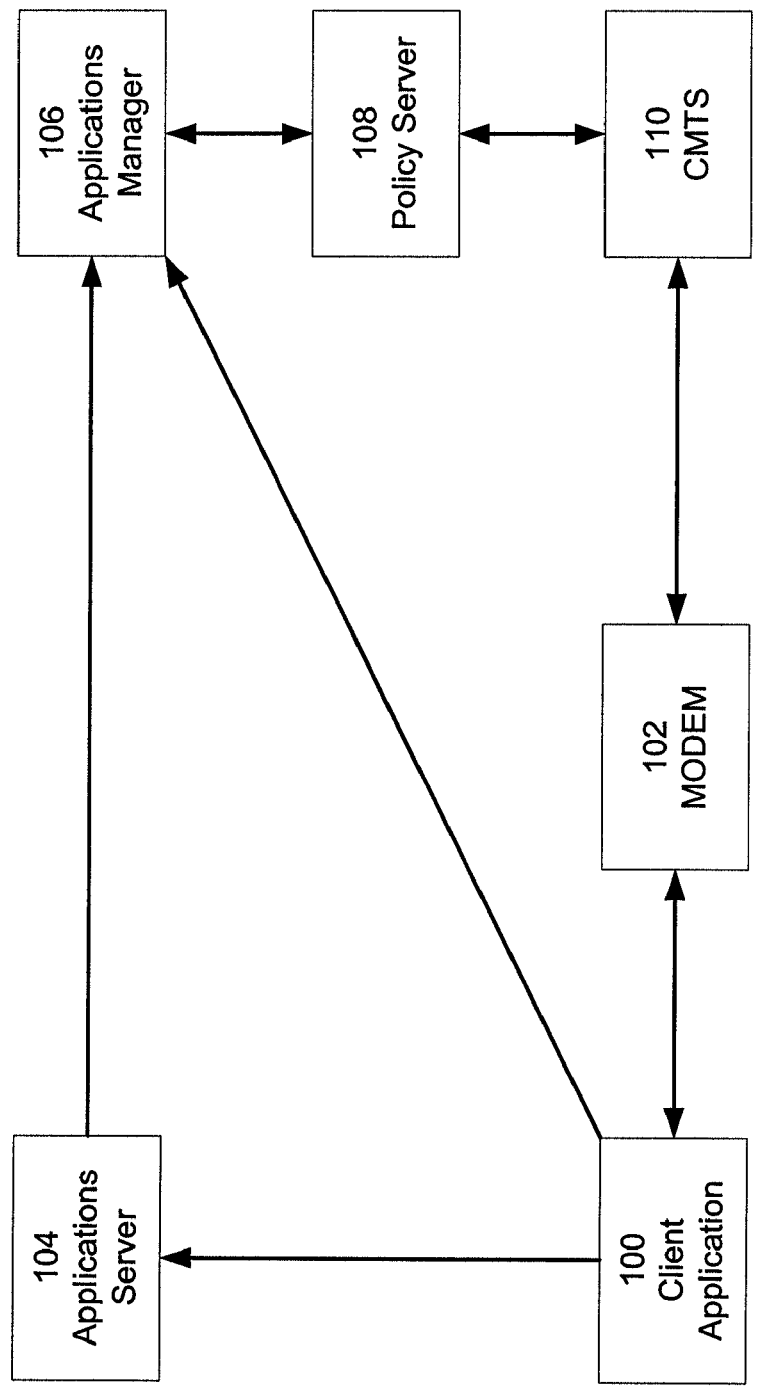
FIG. 1 is a block diagram illustrating the logical components of a PCMM framework implement in a DOCSIS-compliant network.
Figure 2:
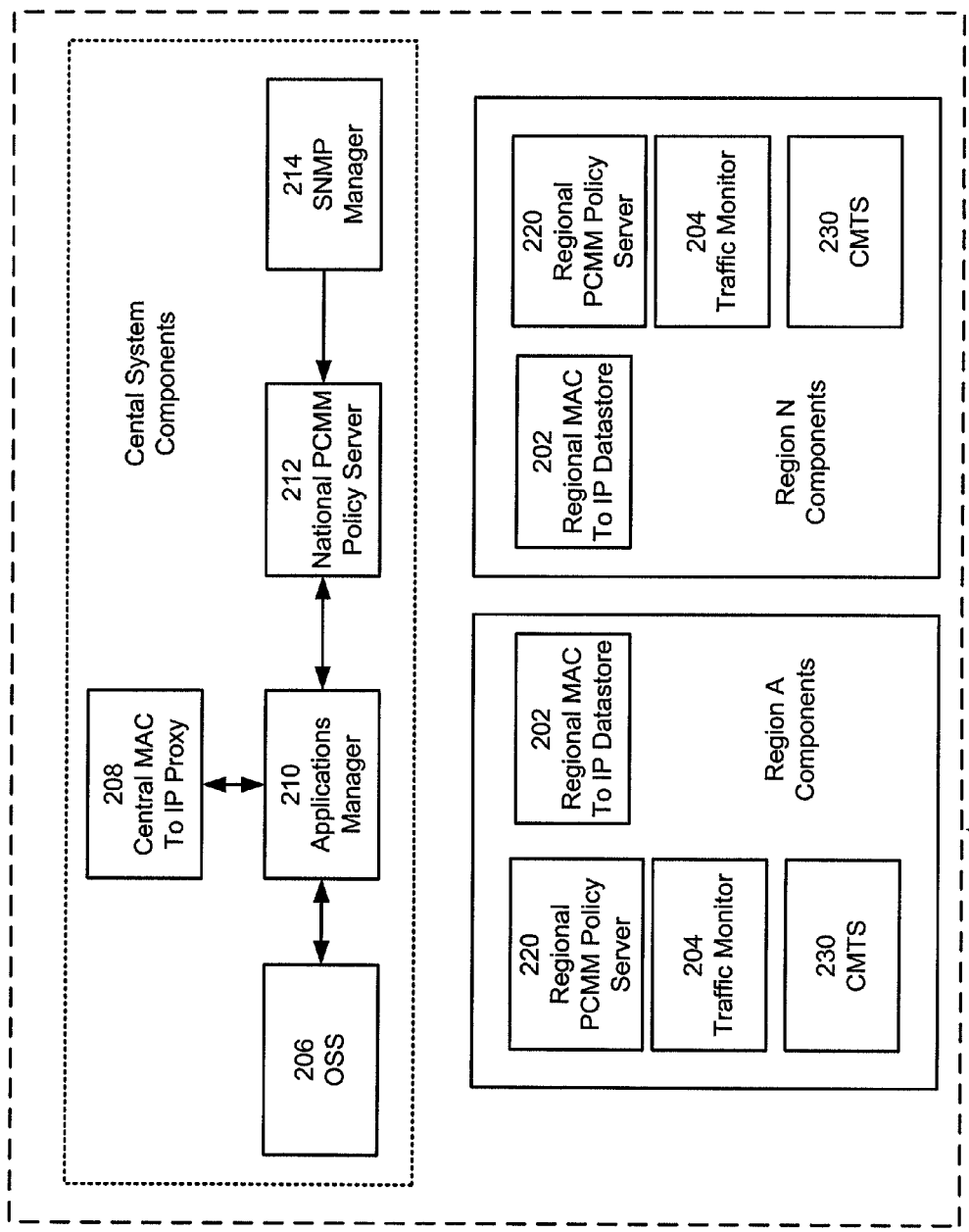
FIG. 2 is a block diagram illustrating components of a subscriber network using PCMM architecture according to an embodiment.

FIG. 2 is a block diagram illustrating components of a subscriber network using PCMM architecture according to an embodiment.

The subscriber network comprises central system components and regions A-N components.

In an embodiment, regions A-N each comprise a CMTS 230, a regional PCMM policy server 220, a regional MAC-to-IP datastore 202 and a network traffic monitor 204. While only a single CMTS 230 is illustrated in each of the regions, a region may support multiple CMTSs. The subscriber network also comprises central components that serve all of the regional components. As illustrated in FIG. 2, the central system components comprise operations support systems (OSS) 206, an applications manager 210, a MAC-to-IP proxy server 208, a national policy server 212, and an SNMP manager 214. In embodiments, one or more of the elements illustrated in FIG. 2 comprise processors (not illustrated) that are configured with software executable instructions that cause the elements to perform the tasks assigned to them as described below.

In an embodiment, the network traffic monitor 204 comprises a processor that is configured with software executable instructions to cause the traffic monitor 204 to monitor at least the upstream traffic in the region. By way of illustration and not by way of limitation, the traffic monitor 204 may detect changes in the packet traffic at one or more routers or nodes in the network region being monitored and compare the traffic in real-time or over a pre-set period to a baseline measure of traffic at the nodes. The baseline data may be time sensitive and destination (or port) sensitive. In addition, the changes may be measured in terms of volume (number of packets) and packet distribution (packet volume of the nodes relative to each other).

The traffic monitor 204 may detect excess upstream packets directed to a port number and obtain an identifier of a subscriber device that is at least one source of the excess upstream packet traffic. The traffic monitor 204 may then report the identifier to the national policy server 212 through the OSS 206 and the applications manager 210.

In an embodiment, the national policy server 212 comprises a processor that is configured with executable instructions to cause the national policy server 212 to apply a policy to the identifier of the subscriber device that limits the upstream bandwidth for upstream packets originating from the subscriber device and that are directed to a particular port number. The national policy server 212 may report the policy, the port number and the identifier of the subscriber device to the regional CMTS 230.

In an embodiment, the regional CMTS comprises a processor that is configured with executable instructions to cause the regional CMTS to enforce the policy against the identifier of the subscriber device.

Figure 3:
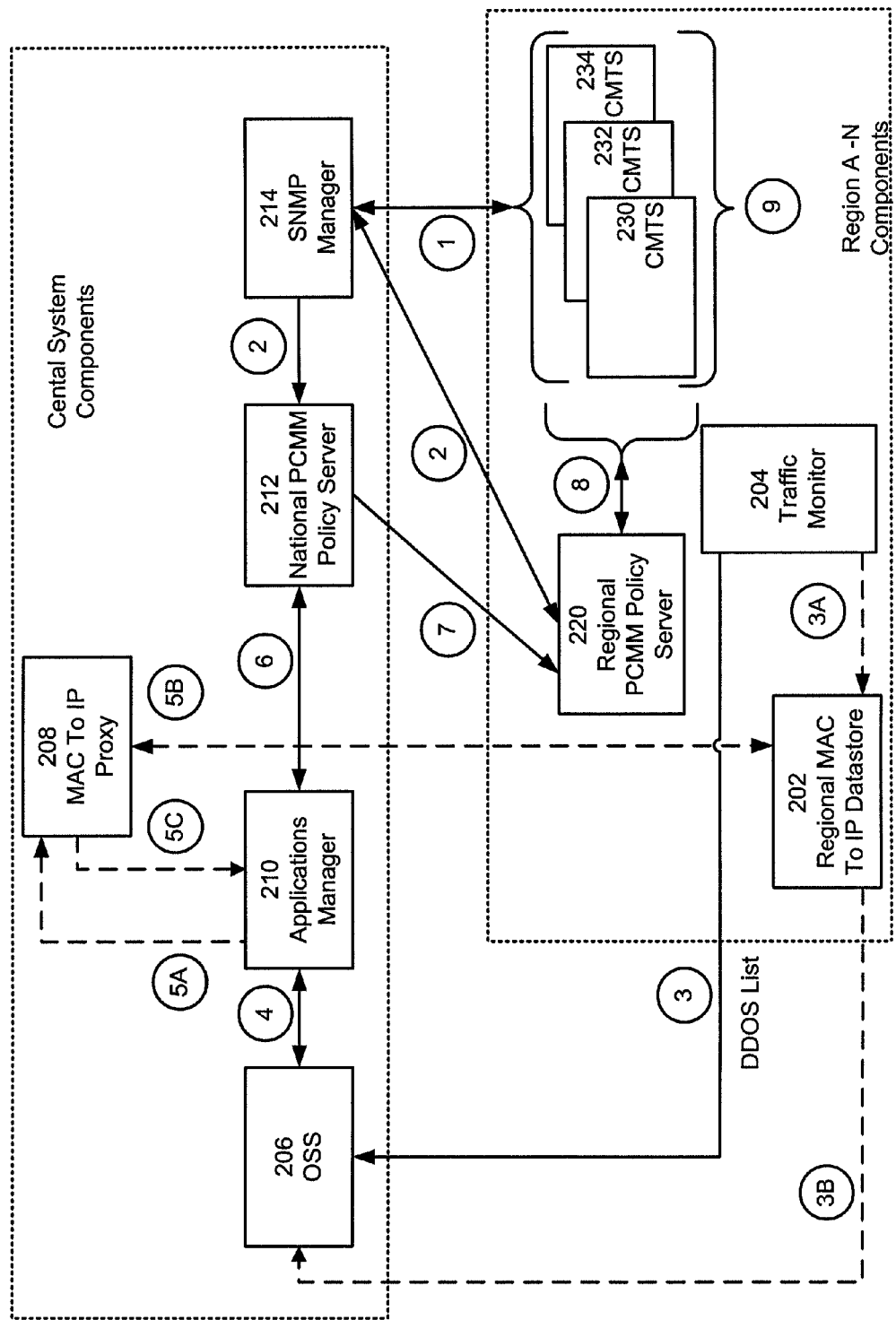
FIG. 3 is a block diagram illustrating a process flow among the national components and the regional components according to an embodiment.

FIG. 3 is a block diagram illustrating a process flow among the national components and the regional components according to an embodiment. For clarity, only the components of region A are illustrated.

In an embodiment, an SNMP manager 214 polls CMTSs 230, 232, and 234 located in region A periodically to obtain information about the subscriber devices that are associated with each CMTS. (Circle 1.) The CMTS-subscriber mapping is communicated to both a national PCMM policy server 212 and a regional PCMM policy server 220. (Circle 2.) The mapping at a minimum provides the policy servers the current IP addresses of the cable modems associated with each CMTS 230, 232, and 234.

Regional network traffic (upstream and downstream) is monitored by traffic monitor 204. In an embodiment, various applications are applied to the upstream network traffic to trigger a DDOS alert. By way of illustration and not by way of limitation, in an embodiment, traffic statistics generated by the network devices are received by a collector (not illustrated). The traffic statistics may be pulled or pushed to the collector. The collector may collect a source IP address, a destination IP address, source port, and a destination port among other metrics. If the collector detects an excessive amount of traffic compared to a threshold from the same source, it triggers the alerts. In another embodiment, a copy of a live traffic is fed into a packet inspection box (not illustrated) and an alert is triggered based on the similar criteria.

In an embodiment, the source IP address is used to create a list of devices that are the sources of the DDOS attack. A list of IP addresses of devices that are the source of the DDOS in the region A is conveyed to an OSS 206. (Circle 3.)

In another embodiment, the IP addresses of the affected devices are conveyed to regional MAC-to-IP datastore 202. (Circle 3A.) The source IP addresses are used to identify the MAC address of the affected devices, and a list of MAC addresses of the affected devices is sent to OSS 206 instead of the IP address list. (Circle 3B.) Because the MAC address is uniquely associated with a device, translating the IP address to the MAC address of an affected device provides insurance against reassignment of the IP address of the device before the process is completed.

The IP address list or the MAC address list is conveyed to an applications manager 210. (Circle 4). Where the IP address list is utilized, the applications manager 210 generates PCMM requests from the IP address list and sends the requests to the national policy server 212. (Circle 6.) Where the MAC address list is used, the applications manager 210 provides the MAC addresses to a MAC-to-IP proxy server 208 to identify the regional MAC-to-IP datastore 202 associated with the MAC addresses. The MAC-to-IP proxy server 208 provides the MAC address to the regional MAC-to-IP datastore 202 and receives the most current IP address associated with those MAC addresses of the affected devices (not illustrated) that are sources of the DDOS attack. (Circle 5B.) The IP addresses are furnished to applications manager 210. (Circle 5C.) The process continues with the applications manager 210 generating PCMM requests from the IP address list and sends the requests to the national policy server 212. (Circle 6.)

In an embodiment, the PCMM requests are generated based on a preconfigured policy. The PCMM requests may include a policy name, a service tier and a time frame. Upon receiving a PCMM request, the applications manager 210 translates the policy name/service tier into QoS parameters.

The national policy server 212 sends the requests to the regional policy server 220. (Circle 7.) The regional policy server 220 provisions the CMTSs 230, 232, and 234 associated with each of the IP addresses on the IP address list with a dynamic service flow. (Circle 8.) The service flow is implemented for each of the affected devices according to the policy implemented on the applications manager 210.

In an embodiment, the determination of a DDOS attack is port specific. Transport Layer protocols, such as TCP, UDP, SCTP, and DCCP, specify a source and destination port number in their packet headers. A port number is typically a 16-bit unsigned integer, thus ranging from 0 to 65535. A process may be associated with a particular port (known as binding). Packets are processed according to the port number to which they are directed or from which they originate. Applications implementing common services will normally "listen" for specific port numbers which are defined by convention for use with the given protocol. For example, email servers typically use port 25 to listen for incoming requests. Email clients typically use port 110 to fetch email from the server. DNS messages are typically exchanged on port 53.

Because the port number is contained in the packet header, it is readily interpreted not only by the sending and receiving computers, but also by traffic monitoring systems. In an embodiment, the traffic monitor 204 monitors bandwidth usage directed to a source having a particular port number. When excessive traffic is detected, a policy may be implemented to throttle packets originating from a particular device and directed to the particular port.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a processor. A general-purpose processor may be a microprocessor, but, in the alternative, the processor may be any conventional processor, controller, microcontroller, or state machine. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as cellular, infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically and discs reproduce data optically with lasers. Combinations of the above should also be included within the scope of computer-readable media. Additionally, the operations of a method or algorithm may reside as one or any combination or set of codes and/or instructions on a machine-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for mitigating a denial of service attack in a subscriber network comprising:
    monitoring upstream packets in a region of the subscriber network using a traffic monitor;
    detecting excess upstream packets directed to a port in the region of the subscriber network using the traffic monitor, wherein the port is identified by a port number;
    obtaining by the traffic monitor an identifier of a subscriber device identified as a source of the excess upstream packets, wherein the subscriber device is connected to the subscriber network via one of a plurality of regional cable modem termination systems (CMTSs);
    reporting the subscriber device identifier to a national policy server;
    applying by the national policy server a policy to the identifier of the subscriber device, wherein the policy limits the upstream bandwidth for upstream packets originating from the subscriber device directed to the port number;
    reporting the policy, the port number and the identifier of the subscriber device to regional policy server, wherein the regional policy server is in communication with the plurality of regional CMTSs;
    identifying by the regional policy server the one of the plurality of regional CMTSs to which the subscriber device identified by the identifier is connected;
    reporting by the regional policy server the policy to the identified one of the plurality of regional CMTSs: and
    enforcing by the one of the plurality of regional CMTSs the policy against the identifier of the subscriber device.

2. The method of claim 1, wherein the subscriber device is a cable modem.

3. The method of claim 1, wherein the policy is associated with a service flow and wherein applying the policy to the subscriber device comprises applying the service flow to the subscriber device.

4. The method of claim 1, wherein the identifier is the IP address of the subscriber device.

5. The method of claim 1, wherein the port number is associated with an application that is selected from the group defined as well-known ports (0-1023) and/or registered ports (>1023) as defined in RFC 1700.

6. The method of claim 1, wherein detecting excess upstream packets directed to a port in the region of the subscriber network comprises:
    establishing a baseline volume of packets comprising the port number for a network node at a particular time;
    measuring the actual volume of packets comprising the port number at the network node at the particular time;
    comparing the baseline volume to the actual volume; and
    when the actual volume exceeds the baseline volume by a pre-set amount, determining that excess upstream packets directed to the port have been detected.

7. A system for mitigating a denial of service attack in a subscriber network comprising:
    the subscriber network, wherein the subscriber network comprises regions;
    a traffic monitor comprising a first processor, wherein the first processor is configured with executable instructions to cause the traffic monitor to perform operations comprising:
        monitoring upstream packets in a region of the subscriber network;
        detecting excess upstream packets directed to a port in the region of the subscriber network, wherein the port is identified by a port number;
        obtaining an identifier of a subscriber device identified as a source of the excess upstream packets, wherein the subscriber device is connected to the subscriber network via one of a plurality of regional cable modem termination systems (CMTSs); and
        reporting the identifier to a national policy server;
    the national policy server, wherein the national policy server comprises a second processor, wherein the second processor is configured with executable instructions to cause the national policy server to perform operations comprising:
        applying a policy to the identifier of the subscriber device, wherein the policy limits the upstream bandwidth for upstream packets originating from the subscriber device directed to the port number;
        reporting the policy, the port number and the identifier of the subscriber device to a regional policy server, wherein the regional policy server is in communication with the plurality of regional CMTSs; and
    the regional policy server, wherein the regional policy server comprises a third processor, wherein the third processor is configured with executable instructions to cause the regional policy server to perform operations comprising:
        identifying by the regional policy server the one of the plurality of regional CMTSs to which the subscriber device identified by the identifier is connected;
        reporting by the regional policy server the policy to the identified one of the plurality of regional CMTSs, wherein the identified one of the plurality of regional CMTSs comprises a fourth processor and wherein the fourth processor is configured with executable instructions to cause the identified one of the plurality of regional CMTSs to perform operations comprising enforcing the policy against the identifier of the subscriber device.

8. The system of claim 7, wherein the subscriber device is a cable modem.

9. The system of claim 7, wherein the policy is associated with a service flow and wherein the operation of applying the policy to the subscriber device comprises applying the service flow to the subscriber device.

10. The system of claim 7, wherein the identifier is the IP address of the subscriber device.

11. The system of claim 7, wherein the port number is associated with an application that is selected from the group defined as well-known ports (0-1023) and/or registered ports (>1023) as defined in RFC 1700.

12. The method of claim 7, wherein the operation of detecting excess upstream packets directed to a port in the region of the subscriber network comprises:
   establishing a baseline volume of packets comprising the port number for a network node at a particular time;
   measuring the actual volume of packets comprising the port number at the network node at the particular time;
   comparing the baseline volume to the actual volume; and
   when the actual volume exceeds the baseline volume by a pre-set amount, determining that excess upstream packets directed to the port have been detected.

13. The method of claim 1,
wherein obtaining by the traffic monitor an identifier of a subscriber device comprises:
   obtaining a source IP address from an upstream packet originating from the subscriber device;
   conveying the source IP address to a datastore, wherein the datastore comprises a mapping of source IP addresses to subscriber device media access control (MAC) addresses; and
   obtaining from the datastore a MAC address of the subscriber device, and
wherein the method further comprises:
   receiving by the national policy server the MAC address of the subscriber device;
   conveying by the national policy server the MAC address of the subscriber device to the datastore; and
   receiving by the national policy server a most current IP address associated with the MAC address of the subscriber device; and
   using by the national policy server the most current IP address as the identifier of the subscriber device.

14. The system of claim 7,
wherein the operation of obtaining by the traffic monitor an identifier of a subscriber device comprises:
   obtaining a source IP address from an upstream packet originating from the subscriber device;
   conveying the source IP address to a datastore, wherein the datastore comprises a mapping of source IP addresses to subscriber device media access control (MAC) addresses; and
   obtaining from the datastore a MAC address of the subscriber device, and
wherein the second processor is further configured with executable instructions to cause the national policy server to perform operations comprising:
   receiving the MAC address of the subscriber device;
   conveying the MAC address of the subscriber device to the datastore;
   receiving a most current IP address associated with the MAC address of the subscriber device, and
   using the most current IP address as the identifier of the subscriber device.

* * * * *